(12) United States Patent
Yeh et al.

(10) Patent No.: US 7,702,201 B2
(45) Date of Patent: Apr. 20, 2010

(54) GAIN FLATTENING UTILIZING A TWO-STAGE ERBIUM-BASED AMPLIFIER

(75) Inventors: Chien-Hung Yeh, Jhudong Township, Hsinchu County (TW); Sien Chi, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/545,657

(22) Filed: Oct. 11, 2006

(65) Prior Publication Data

US 2007/0286559 A1 Dec. 13, 2007

Related U.S. Application Data

(60) Provisional application No. 60/811,778, filed on Jun. 8, 2006.

(51) Int. Cl.
*G02B 6/30* (2006.01)
(52) U.S. Cl. .......................................... 385/49; 385/24
(58) Field of Classification Search ................ 385/2, 385/24
See application file for complete search history.

(56) References Cited

U.S. PATENT DOCUMENTS

| | | | | | |
|---|---|---|---|---|---|
| 5,369,523 | A | * | 11/1994 | Millar et al. | 359/341.32 |
| 5,617,244 | A | * | 4/1997 | Percival et al. | 359/341.5 |
| 5,673,141 | A | | 9/1997 | Gambini | |
| 5,861,970 | A | | 1/1999 | Tatham et al. | |
| 6,043,931 | A | | 3/2000 | Jourdan et al. | |
| 6,236,498 | B1 | | 5/2001 | Freeman et al. | |
| 6,335,941 | B1 | * | 1/2002 | Grubb et al. | 372/6 |
| 6,388,806 | B1 | | 5/2002 | Freeman et al. | |
| 6,408,121 | B1 | * | 6/2002 | Goto | 385/129 |
| 6,462,863 | B1 | | 10/2002 | Atieh et al. | |
| 6,490,077 | B1 | | 12/2002 | Conradi | |
| 6,603,593 | B2 | * | 8/2003 | Fidric et al. | 359/334 |
| 6,778,320 | B1 | | 8/2004 | Traynor | |
| 6,785,304 | B2 | * | 8/2004 | Filgas | 372/19 |
| 6,825,972 | B2 | | 11/2004 | Emori et al. | |
| 6,890,450 | B2 | * | 5/2005 | Naydenkov et al. | 216/24 |
| 7,012,742 | B2 | | 3/2006 | Lee et al. | |

(Continued)

FOREIGN PATENT DOCUMENTS

WO WO 03/084007 A1 10/2003

OTHER PUBLICATIONS

M. Yamada et al., "Fluoride-Based Erbium-Doped Fiber Amplifier with Inherently Flat Gain Spectrum," IEEE Photonics Technology Letters, vol. 8, No. 7, pp. 882-884, Jul. 1996.

(Continued)

*Primary Examiner*—Frank G Font
*Assistant Examiner*—Peter Radkowski
(74) *Attorney, Agent, or Firm*—Finnegan, Henderson, Farabow, Garrett & Dunner, LLP

(57) ABSTRACT

An optical amplifier is disclosed having a substantially uniform spectral gain. In an exemplary embodiment, the optical amplifier comprises a planar waveguide including a substrate, which includes a region doped with rare earth element. The optical amplifier also comprises an optical fiber including a core doped with the rare earth element. The optical fiber is optically coupled to the planar waveguide.

22 Claims, 9 Drawing Sheets

U.S. PATENT DOCUMENTS

| | | | |
|---|---|---|---|
| 2002/0041432 A1* | 4/2002 | Onaka et al. | 359/337.1 |
| 2002/0104822 A1* | 8/2002 | Naydenkov et al. | 216/24 |
| 2002/0191902 A1* | 12/2002 | Gao | 385/24 |
| 2002/0191926 A1* | 12/2002 | Gao | 385/123 |
| 2003/0099424 A1* | 5/2003 | Mohajer et al. | 385/14 |
| 2003/0133181 A1* | 7/2003 | Gao | 359/341.3 |
| 2003/0165007 A1* | 9/2003 | Frolov et al. | 359/337.4 |
| 2003/0184851 A1* | 10/2003 | Tian et al. | 359/341.4 |
| 2003/0202770 A1* | 10/2003 | Garito et al. | 385/141 |
| 2003/0234978 A1* | 12/2003 | Garito et al. | 359/341.5 |
| 2004/0071419 A1* | 4/2004 | Berkey et al. | 385/123 |
| 2004/0136681 A1* | 7/2004 | Drewery et al. | 385/142 |
| 2005/0185256 A1* | 8/2005 | Kim et al. | 359/333 |
| 2005/0201675 A1* | 9/2005 | Knopp et al. | 385/27 |
| 2007/0285765 A1 | 12/2007 | Yeh et al. | |

OTHER PUBLICATIONS

M. Pandit et al., "Tunable Long-Period Fiber Gratings for EDFA Gain and ASE Equalization," Microwave and Optical Technology Letters, vol. 25, No. 3, pp. 181-184, May 5, 2000.

P. Wysocki et al., "Broad-Band Erbium-Doped Fiber Amplifier Flattened Beyond 40 nm Using Long-Period Grating Filter," IEEE Photonics Technology Letters, vol. 9, No. 10, pp. 1343-1345, Oct. 1997.

S. Liaw et al., "Dynamic Power-Equalized EDFA Module Based on Strain Tunable Fiber Bragg Gratings," IEEE Photonics Technology Letters, vol. 11, No. 7, pp. 797-799, Jul. 1999.

R. Feced et al., "Acoustooptic Attenuation Filters Based on Tapered Optical Fibers," IEEE Journal of Selected Topics in Quantum Electronics, vol. 5, No. 5, pp. 1278-1288, Sep./Oct. 1999.

S. Yun, et al., "Dynamic Erbium-Doped Fiber Amplifier based on Active Gain Flattening with Fiber Acoustooptic Tunable Filters," IEEE Photonics Technology Letters, vol. 11, No. 10, pp. 1229-1231, Oct. 1999.

J. Nilsson et al., "Simple gain-flattened erbium-doped fiber amplifier with a wide dynamic range," Opt. Fiber Communication Conference, Washington, D.C.: Optical Society of America, OSA Technical Digest, pp. 129-130, 1997.

R. Betts et al., "Split-beam Fourier filter and its application in a gain-flattened EDFA," Opt. Fiber Communication Conference, Washington, D.C.: Optical Society of America, OSA Technical Digest, pp. 80- 81, 1995.

S. Li et al., "Gain Flattening of an Erbium-Doped Fiber Amplifier Using a High-Birefringence Fiber Loop Mirror," IEEE Photonics Technology Letters, vol. 13, No. 9, pp. 942-944, Sep. 2001.

J. Ania-Castanon et al., "Simple design method for gain-flattened three-pump Raman amplifiers," IEEE LEOS, vol. 2, pp. 500-501, 2002.

Y. Sun et al., "80nm ultra-wideband erbium-doped silica fiber amplifier," Electronics Letters, vol. 33, No. 23, pp. 1965-1967, Nov. 6, 1997.

H. Masuda et al., "Wideband, gain-flattened, erbium-doped fibre amplifiers with 3dB bandwidths of >50nm," Electronics Letters, vol. 33, No. 12, pp. 1070-1072, Jun. 5, 1997.

B. Min et al., "Coupled Structure for Wide-Band EDFA with Gain and Noise Figure Improvements from C to L-Band ASE Injection," IEEE Photonics Technology Letters, vol. 12, No. 5, pp. 480-482, May 2000.

R. Di Muro et al., "Broad-Band Amplification Using a Novel Amplifier Topology," IEEE Photonics Technology Letters, vol. 13, No. 10, pp. 1073-1075, Oct. 2001.

S. Hwang et al., "Comparative high power conversion efficiency of C-plus L-band EDFA," Electronics Letters, vol. 37, No. 25, pp. 1539-1541, Dec. 6, 2001.

Y. Lu et al., "All-optical gain-clamped wideband serial EDFA with ring-shaped laser," Optics Communications, vol. 229, pp. 317-323, 2004.

Q. Jiang et al., "Dynamically Gain Control in the Serial Structure C + L Wide-Band EDFA," IEEE Photonics Technology Letters, vol. 16, No. 1, pp. 87-89, Jan. 2004.

S. Harun et al., "Double-Pass L-Band EDFA with Enhanced Noise Figure Characteristics," IEEE Photonics Technology Letters, vol. 15, No. 8, pp. 1055-1057, Aug. 2003.

L. Yi et al., "Improvement of Gain and Noise Figure in Double-Pass L-Band EDFA by Incorporating a Fiber Bragg Grating," IEEE Photonics Technology Letters, vol. 16, No. 4, pp. 1005-1007, Apr. 2004.

H. Choi et al., "Simple and efficient L-band erbium-doped fiber amplifiers for WDM networks," Optics Communications, vol. 213, pp. 63-66, 2002.

S. Namiki et al., "Ultrabroad-Band Raman Amplifiers Pumped and Gain-Equalized by Wavelength-Division-Multiplexed High-Power Laser Diodes," IEEE Journal on Selected Topics in Quantum Electronics, vol. 7, No. 1, pp. 3-16, Jan./Feb. 2001.

Japan Office Action for Application No. 2007-150497 dated Aug. 25, 2009, and partial English translation thereof.

Patent Abstracts of Japan—English Translation of Publication No. 04-102806, Apr. 3, 1992.

Patent Abstracts of Japan—English Translation of Publication No. 2003-188445, Jul. 4, 2003.

Patent Abstracts of Japan—English Translation of Publication No. 06-069572, Mar. 11, 1994.

Patent Abstracts of Japan—English Translation of Publication No. 2005-116884, Apr. 28, 2005.

Patent Abstracts of Japan—English Translation of Publication No. 05-021874, Jan. 29, 1993.

* cited by examiner

GAIN FLATTENING UTILIZING A TWO-STAGE ERBIUM-BASED AMPLIFIER

CROSS-REFERENCE TO RELATED APPLICATION

This application claims the benefit of priority from U.S. Provisional Application No. 60/811,778, entitled "Gain-Flattened Two-Stage Erbium-Based Fiber Amplifier Module," filed on Jun. 8, 2006, the disclosure of which is expressly incorporated herein by reference to its entirety.

TECHNICAL FIELD

The present invention generally relates to the fields of fiber optics and the amplification of optical signals. More specifically, the invention relates to systems and methods for providing a gain flattened amplification of an optical signal.

BACKGROUND INFORMATION

Optical communication systems are known which carry an optical channel of a single wavelength over one or more optical fibers. To convey information from plural sources, time-division multiplexing (TDM) is frequently employed. In TDM, a particular time slot is assigned to each signal source, and the complete signal is constructed from portions associated with each time slot. While this is a useful technique for carrying plural information sources on a single optical channel, its capacity is limited by fiber dispersion and the need to generate high peak power pulses.

Wavelength division multiplexing (WDM) has been explored as an approach for increasing the capacity of existing fiber optic networks. In a WDM system, plural optical signal channels are carried over a single optical fiber with each channel being assigned a particular wavelength. Since each optical channel itself can be time division multiplexed, the overall information carrying capacity of the fiber optic network can be increased substantially.

Optical channels in a WDM system are frequently transmitted over silica based optical fibers, which typically have relatively low loss at wavelengths within a range of 1520 to 1580 nm. WDM optical signal channels at wavelengths within this low loss "window" can be transmitted over distances of approximately 50 km without significant attenuation. For distances beyond 50 km, however, optical amplifiers are required to compensate for optical fiber loss.

Optical amplifiers have been developed which include a gain medium doped with a rare earth element, such as erbium, praseodymium, neodymium, and tellurium. The most commonly used rare earth element is erbium because it produces the greatest gain within the wavelength range of 1520 to 1580 nm. The erbium doped medium is "pumped" with light at a selected wavelength, e.g., 980 nm, to provide amplification or gain at wavelengths within the low loss window of the optical fiber.

However, erbium doped amplifiers do not uniformly amplify light within the spectral region of 1520 to 1580 nm. For example, an optical channel at a wavelength of 1540 nm is typically amplified 4 dB more than an optical channel at a wavelength of 1555 nm. While such a large variation in gain can be tolerated in a system with only one optical amplifier, it typically cannot be tolerated in a system with plural optical amplifiers or numerous, narrowly-spaced optical channels. In these environments, much of the pump power supplies energy for amplifying light at the high gain wavelengths rather than amplifying the low gain wavelengths. As a result, low gain wavelengths suffer excessive noise accumulation after propagating through several amplifiers.

Accordingly, optical amplifiers providing substantially uniform spectral gain have been developed. In particular, optical amplifiers including an optical filter provided between first and second stages of an erbium doped fiber are known to provide gain flatness. In these amplifiers, the first stage is operated in a high power mode. Although the second stage introduces more noise than the first, the overall noise output by the amplifier is low due to the low noise signal of the first stage. The optical filter selectively attenuates the high gain wavelengths, while passing the low gain wavelengths, so that the gain is substantially equal for each wavelength output from the second stage. The optical filter can include any one of a fiber Bragg grating, fiber acousto-optic tunable filter, Mach-Zehnder filter, thin film filter, and a split beam filter.

However, when the optical filter is combined with other components in the optical amplifier, such as other filters which may be present, the overall loss of the optical amplifier may increase. Accordingly, there is a need for an optical amplifier having reduced loss.

SUMMARY

In accordance with the principles of the present invention, as embodied and broadly described herein, methods and systems are provided for enhancing the gain of an optical amplifier.

According to one embodiment, an optical amplifier is provided that comprises a planar waveguide including a substrate, the substrate including a region doped with a fluorescent material. The optical amplifier also comprises an optical fiber including a core doped with the fluorescent material, the optical fiber being optically coupled to the planar waveguide.

According to another embodiment, a wavelength division multiplexing transmission system is provided that comprises a plurality of transmitters, each of the plurality of transmitters being configured to transmit a respective one of a plurality of optical signals, wherein each of the plurality of optical signals is at a respective one of a plurality of wavelengths. The wavelength division multiplexing transmission system also includes a multiplexer configured to combine the plurality of optical signals onto an optical communication path, and an optical amplifier. The optical amplifier may comprise a planar waveguide including a substrate, the substrate including a region doped with a fluorescent material and an optical fiber including a core doped with the fluorescent material, the optical fiber being optically coupled to the planar waveguide. The wavelength division multiplexing transmission system may further comprise a demultiplexer configured to separate each of the plurality of optical signals based on their respective wavelength and a plurality of receivers configured to receive the separated optical signals and convert the optical signals into corresponding electrical signals.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings show features of implementations consistent with the present invention and, together with the corresponding written description, help explain principles associated with the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
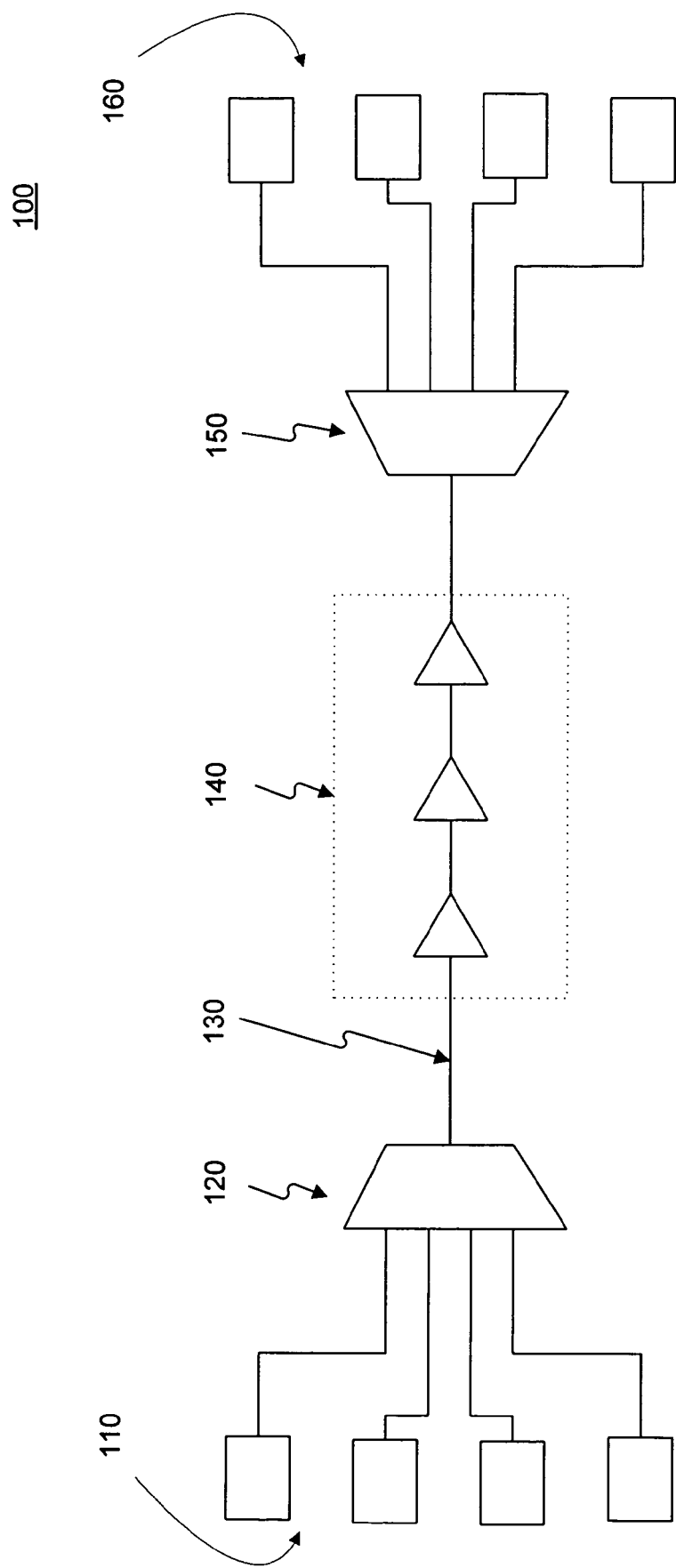
FIG. 1 illustrates a wavelength division multiplexing transmission system, consistent with an aspect of the present invention.

FIG. 1 illustrates a block diagram of an exemplary WDM transmission system 100, consistent with certain aspects related to the present invention. As shown, system 100 may include a plurality of transmitters 110, WDM multiplexer 120, optical fiber communication path 130, one or more optical amplifiers 140, a WDM demultiplexer 150, and a plurality of receivers 160. The transmission of optical signals through system 100 typically involves each of the plurality of transmitters 110 transmitting an optical signal at a different wavelength. Typically, the fiber communication path includes silica optical fiber and the wavelengths are in a range of 1520 to 1580 nm, the low loss "window" of communication path 130. The transmitters 110 may comprise a light source, such as a light emitting diode or a laser, that may be modulated according to a binary input stream. Each optical signal output from transmitters 110 enters WDM multiplexer 120, which combines the signals and transmits the combined signals along optical fiber communication path 130. Optical fiber communication path 130 typically includes one or more segments of optical fiber.

Typically, one or more optical amplifiers 140 are provided along communication path 130 to amplify the transmitted signals in order to offset any losses associated with communication path 130. As described in greater detail below with respect to FIG. 2, optical amplifier 140 comprises a two-stage amplifier that provides substantially uniform gain.

After propagating along communication path 130, the optical signals are next supplied to a known WDM demultiplexer 150, which separates the incoming signals based upon their respective wavelength. The signals output from WDM demultiplexer 150 are then supplied to corresponding receivers 160, which may comprise a photodetector capable of converting the received optical signal to a corresponding electrical signal for further processing.

Figure 2:
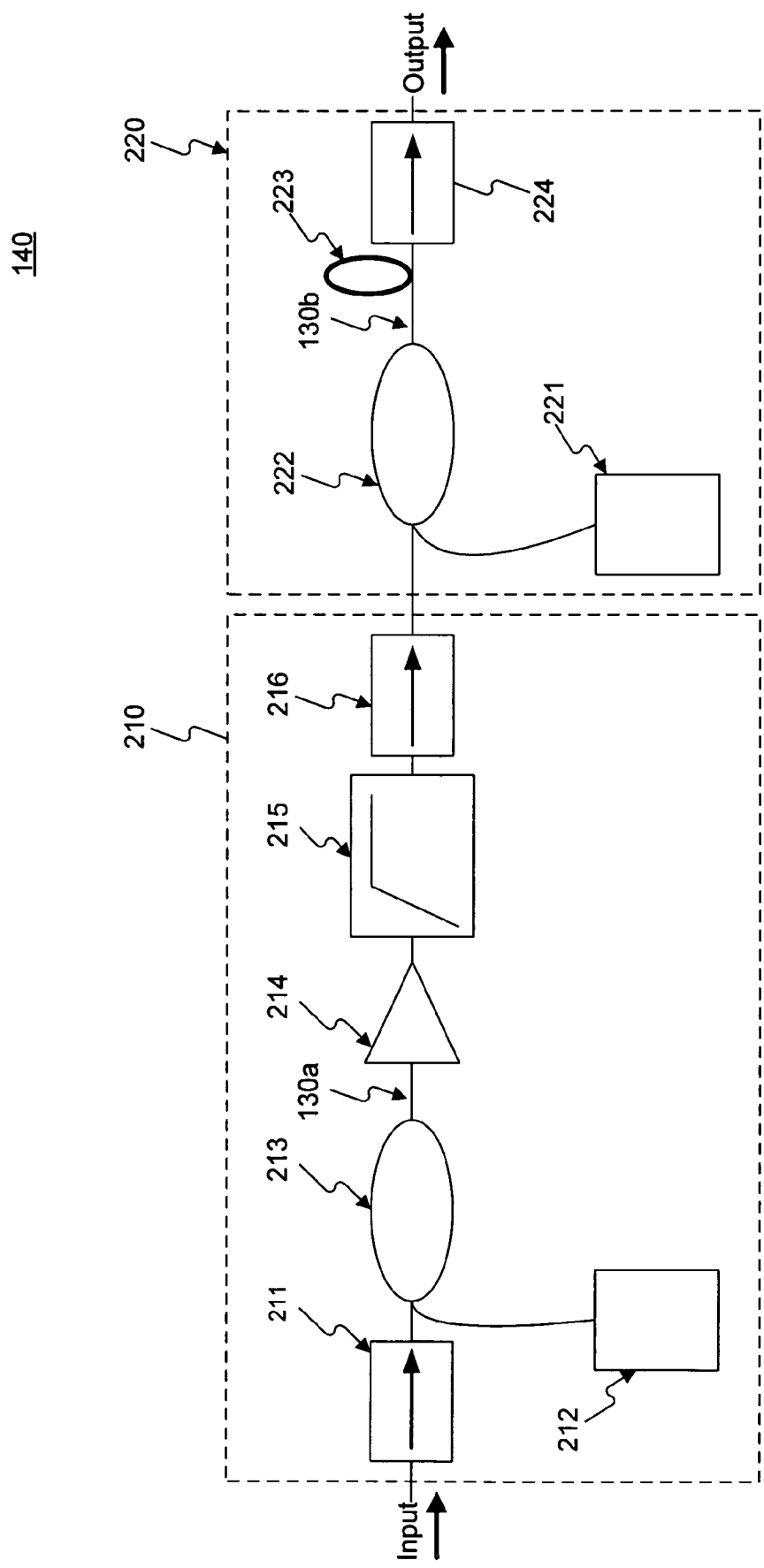
FIG. 2 illustrates a block diagram of an exemplary embodiment of a two-stage amplifier system, consistent with an embodiment of the present invention.

FIG. 2 illustrates a block diagram of an exemplary embodiment of a two-stage optical amplifier system 140, consistent with certain aspects related to the present invention. As shown, amplifier system 140 may include a first stage 210 and a second stage 220. Both stages typically include an erbium doped gain medium to amplify the optical signal. In particular, the first stage 210 comprises an erbium doped planar waveguide medium, and the second stage 220 typically includes an erbium doped fiber. As discussed in greater detail below, the erbium doped planar waveguide medium includes a substrate which is relatively compact, whereas the erbium doped fiber is typically several meters to several tens of meters in length.

As further shown in FIG. 2, an incoming WDM signal including multiple channels of optical signals, each at a different wavelength, is supplied to an optical isolator 211 in first stage 210 of amplifier system 140. Optical isolator 211 is typically a passive device that substantially prevents return reflections along communication path 130. For example, optical isolator 211 substantially prevents amplified spontaneous emission (ASE) light generated within first stage 210 from propagating along communication path 130, portions of which may reflect the ASE light back into first stage 210 and increase noise.

After passing through optical isolator 211, the WDM signal (i.e., a first input optical signal) is combined with a first pump light in a known first optical coupler 213, which may include a fused fiber coupler or thin film filter, for example. Optical coupler 213 is coupled to the input portion of planar waveguide medium 214 via a first optical communication path 130a. The pump first light is typically output from an optical source 212, such as a laser or light emitting diode, and may be at a wavelength substantially equal to 980 nm, although other known pump wavelengths, such as 1480 nm may also be used.

Figure 3:
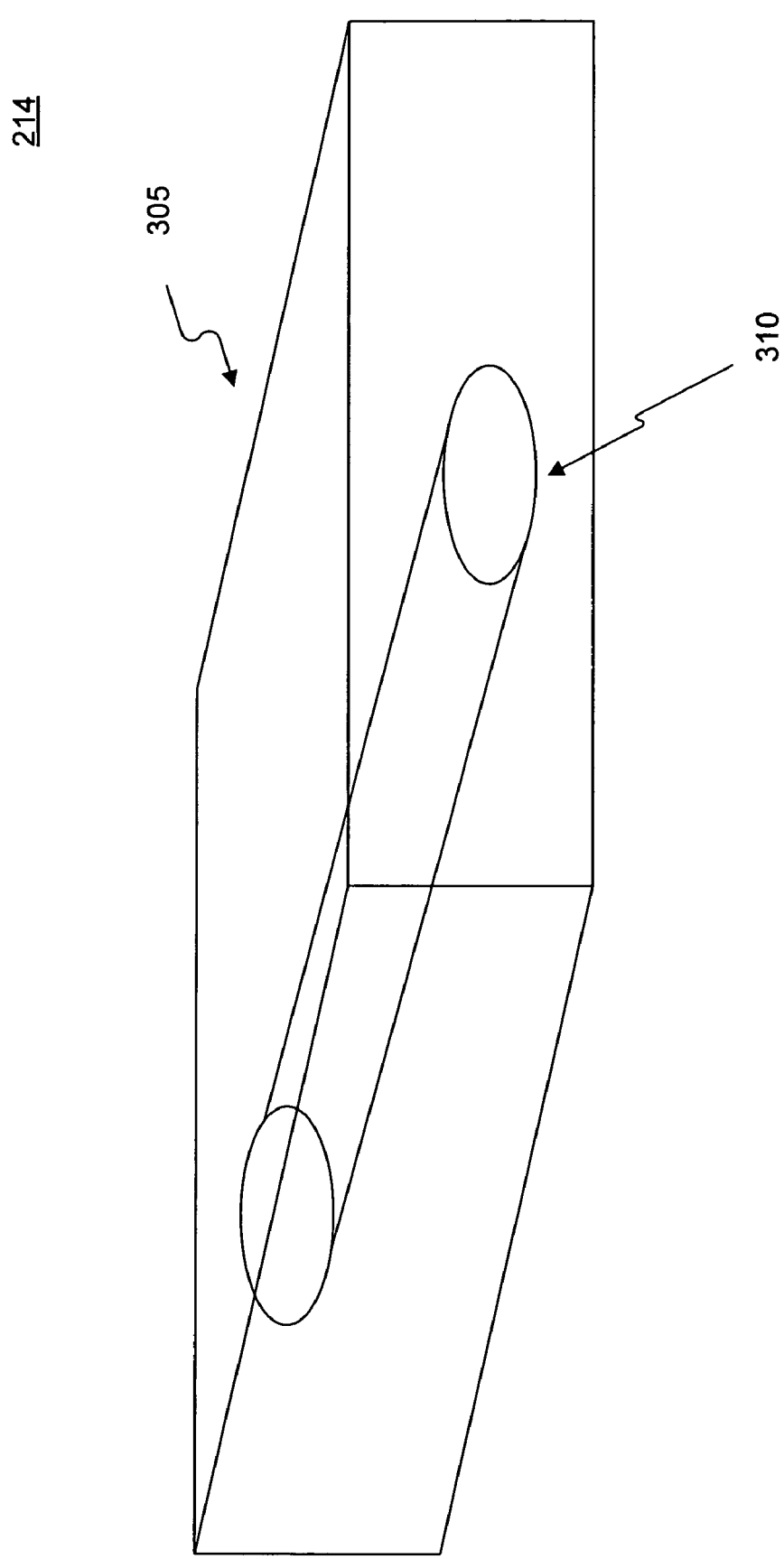
FIG. 3 illustrates a block diagram of an exemplary embodiment of an erbium doped planar waveguide, consistent with an embodiment of the present invention.

Next, the combined pump light and WDM signal is supplied to the input portion of planar waveguide medium 214 via the first optical communication path portion 130a. As shown in FIG. 3, waveguide medium 214 typically includes a planar waveguide and may include a silica or glass substrate 305 having an embedded region 310 having a relatively high refractive index (compared to the surrounding substrate) so that light supplied to region 310 is confined to that portion of substrate 305. Embedded region 310 may be formed in a known ion exchange process or by sputtering. Planar waveguide medium 214 is relatively small, and has reduced polarization dependence and reduced cross-talk, for example.

In operation, the pump light output from optical source 212 excites erbium atoms in region 310, and when these atoms relax to a lower energy state through stimulated emission, for example, light is emitted at one or more of the WDM signal wavelengths, thereby providing amplification to the input WDM signal. The amplified WDM signal output from the output portion of planar waveguide medium 214 is next supplied to filter 215, which is coupled to the output portion of planar waveguide medium 214 and substantially blocks transmission of pump light that is not absorbed by planar waveguide medium 214. After passing through a second optical isolator 216 coupled to filter 215, the WDM signal is output from first stage 210 to second stage 220.

Second stage 220 may include an optical source 221 for outputting second pump light, a WDM coupler 222, erbium doped fiber 223, and an optical isolator 224. The WDM signal input (i.e., a second input optical signal) to second stage 220 is combined with a second pump light output from source 221 with a second optical coupler 222, which has a similar construction as coupler 213. The combined second pump light and WDM signal is then supplied to erbium doped fiber 223 via a second optical communication path portion 130b.

Figure 4:
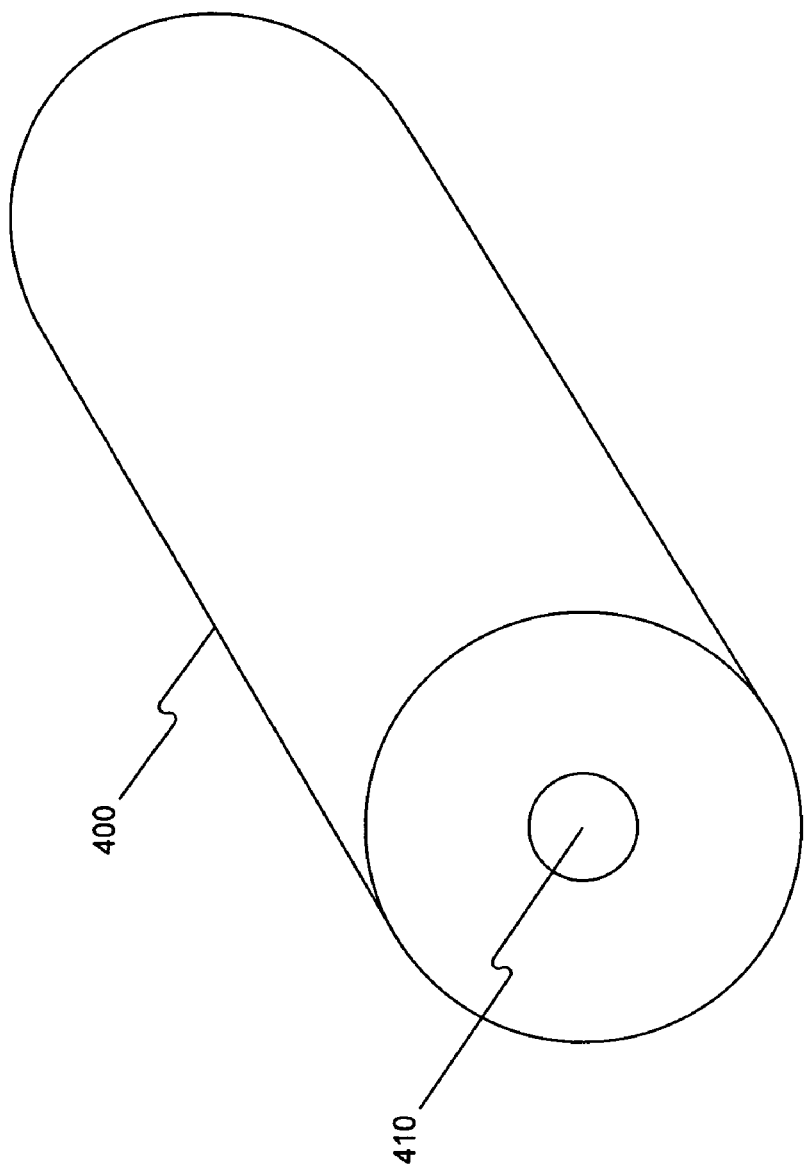
FIG. 4 illustrates a block diagram of an exemplary embodiment of an erbium doped fiber, consistent with an embodiment of the present invention.

As shown in FIG. 4, erbium doped fiber 223 includes a relatively high refractive index core 410, which is doped with erbium, and a relatively low refractive index cladding 420. Due to the refractive index difference between core 410 and cladding 420, the pump light and WDM signal remain substantially confined to the core 410. The pump light (at 980 nm or 1480 nm, for example) is absorbed by erbium atoms in core 410 in a manner similar to that described above with reference to FIG. 3. When the erbium atoms relax to a ground state, as further discussed above, light is emitted at one or more wavelengths of the WDM signal, thereby amplifying the WDM signal. Subsequently, the amplified WDM signal is passed through optical isolator 224 before the WDM signal is output from the second stage 220.

Figure 5:
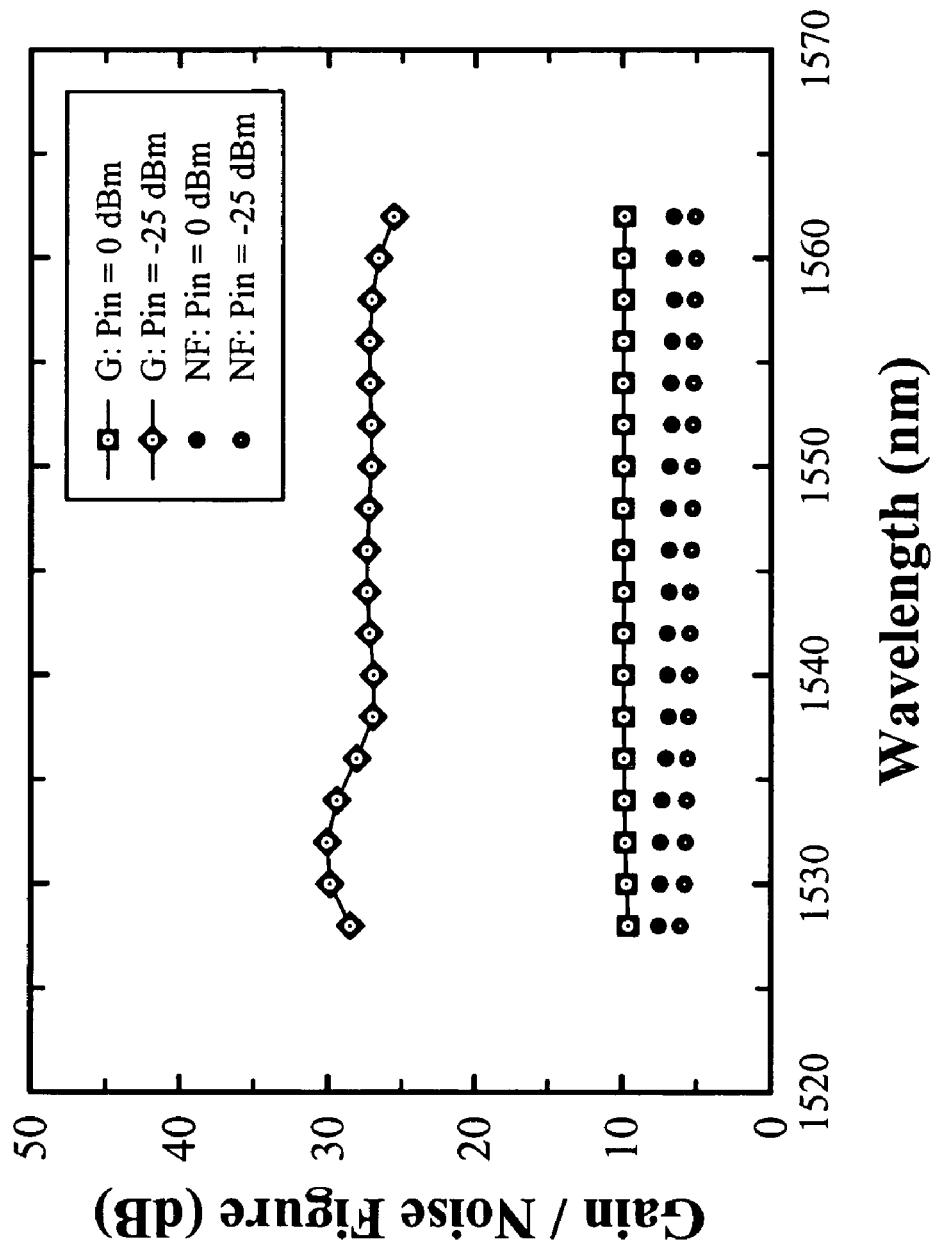
FIG. 5 illustrates a graph of a gain and noise figure spectra of an erbium doped planar waveguide amplifier in a bandwidth of 1520 to 1580 nm for 0 and −25 dBm input signal powers, consistent with an embodiment of the present invention.

Gain performance and noise figure spectra of an exemplary optical amplifier system 140, consistent with the present invention was measured with a tunable laser source and an optical spectrum analyzer with a 0.05 nm resolution. FIG. 5 shows the gain and noise figure profiles of an exemplary first stage 210 for 0 and −25 dBm input signal power (Pin) for WDM input signals in a wavelength range of 1528 to 1562 nm. As illustrated in FIG. 5, a gain (G) of greater than 9.5 dB and a noise figure (NF) of less than 7.5 dB in the wavelengths of 1528 to 1562 nm were obtained for 0 dBm input signal power. However, the peak gain and noise figure (NF) of 30.1 and 5.7 dB were also observed at 1532 nm, and the noise figure was distributed from 5 to 6.3 dB in the wavelengths of 1528 to 1562 nm, when the input signal power was −25 dBm. A maximum gain variation of 4.7 dB over the wavelength range of 1528 to 1562 nm was also obtained.

Figure 6:
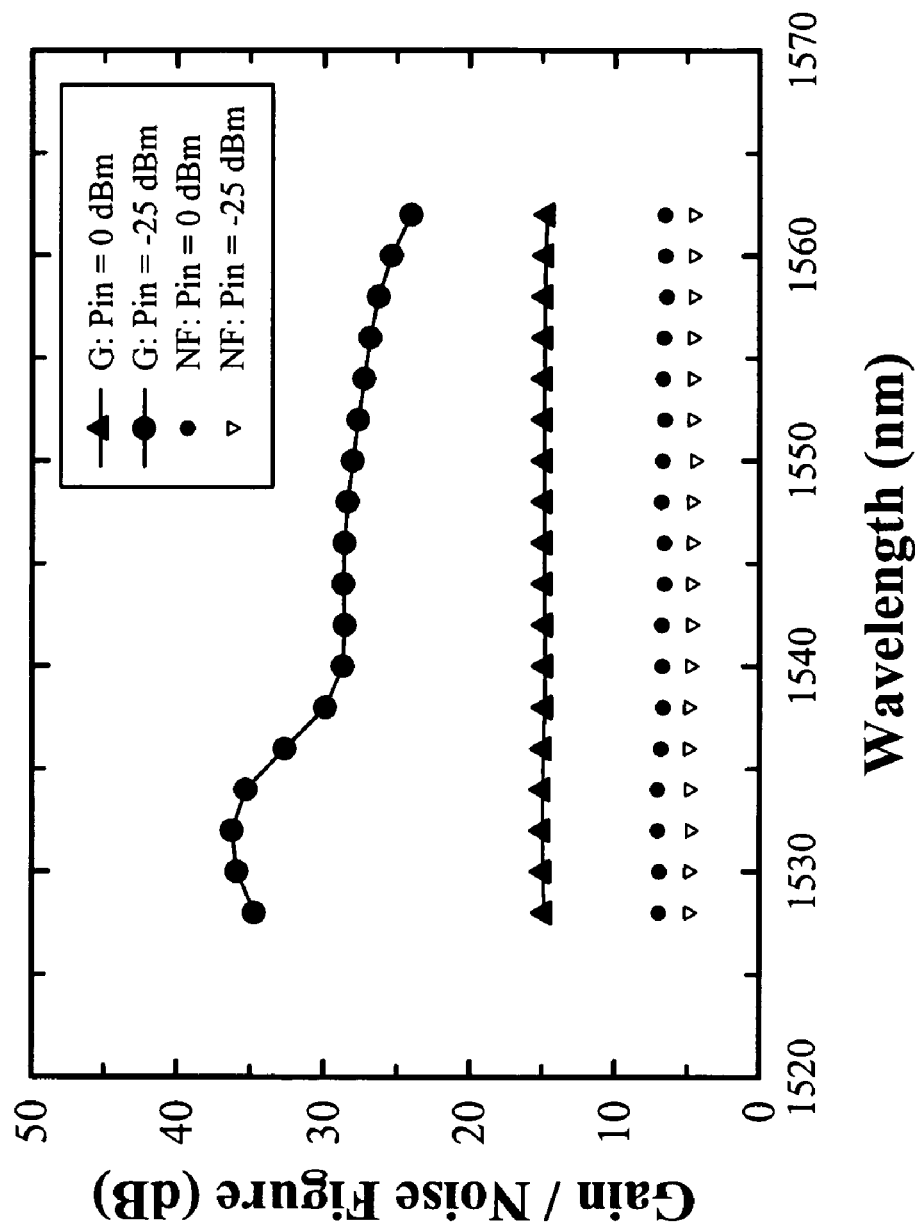
FIG. 6 illustrates a graph of a gain and noise figure spectra of an erbium doped fiber amplifier with 10 m long erbium doped fiber in a bandwidth of 1520 to 1580 nm for 0 and −25 dBm input signal powers with the pump power of 72 mW, consistent with an embodiment of the present invention.

FIG. 6 illustrates the gain and noise figure spectra of an exemplary second stage 220 for input signal powers (Pin) of 0 and −25 dBm for WDM input signals having wavelengths of 1528 to 1562 nm. The spectra was generated using a 10 m long erbium doped fiber as erbium doped fiber 223 in second stage 220 and a laser pump diode power of 980 nm operating at 72 mW. When the input power is 0 dBm, the gain at each wavelength in the range of 1528 nm to 1562 nm is above 14.2 dB and the noise figure ranges from 6.3 to 7.1 dB. Simultaneously, a 36.2 dB peak gain and a 4.8 dB noise figure was observed at 1532 nm for −25 dBm input signal power. A maximum gain variation of 12.2 dB was also obtained in the wavelength range of 1524 to 1562 nm, as shown in FIG. 6.

Figure 7:
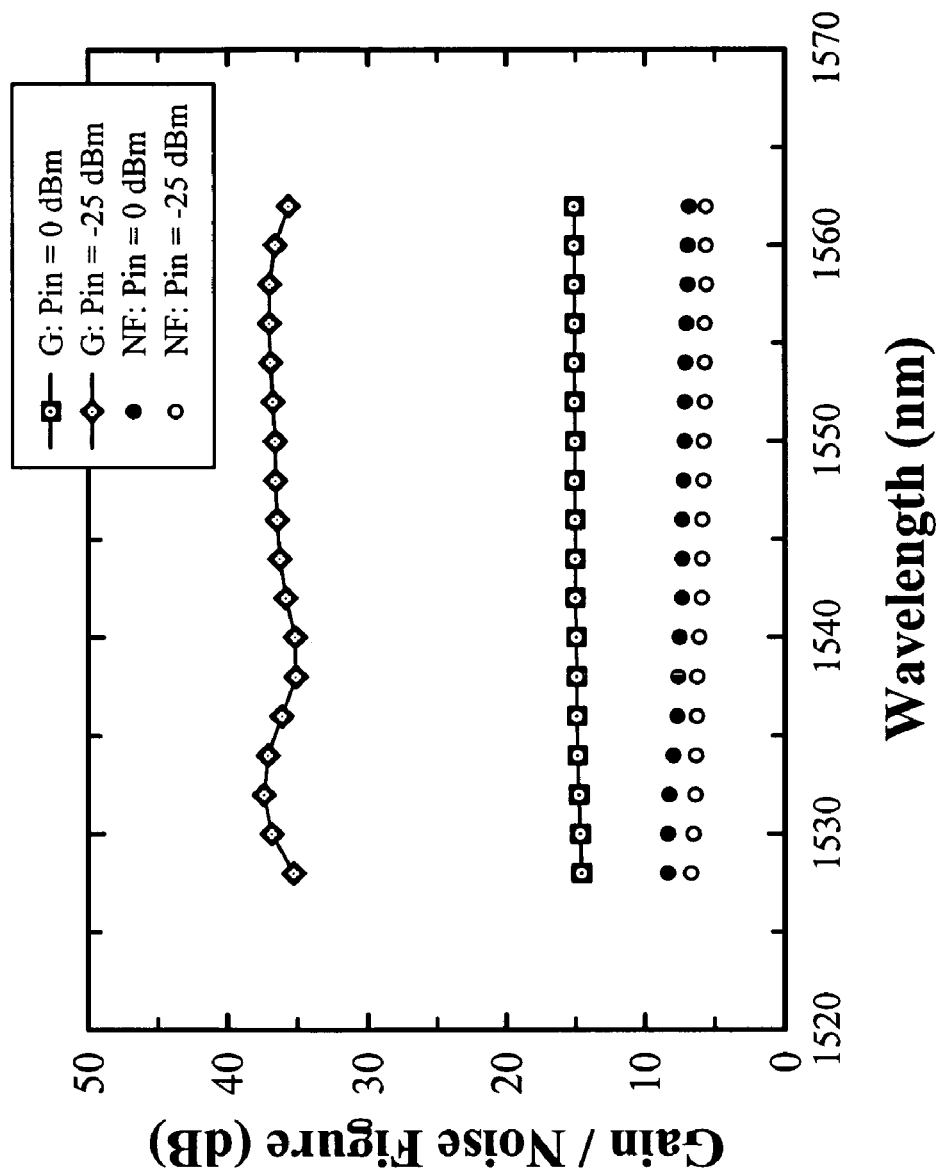
FIG. 7 illustrates a graph of a gain and noise figure spectra of a gain-flattened two-stage amplifier system in a bandwidth of 1520 to 1580 nm for 0 and −25 dBm input signal powers, consistent with an embodiment of the present invention.

FIG. 7 illustrates the gain and noise figure spectra of the exemplary optical amplifier 140 including, the first and second stages having the gain and noise figure characteristics discussed above in regard to FIGS. 5 and 6. When the input signal power (Pin) is 0 dBm, 0.3 dB maximum gain variation is obtained and the gain at each wavelength exceeds 14.8 dB for WDM signals over the wavelength range of 1528 to 1562 nm. Further, FIG. 7 illustrates two peak gains (G) of 37.4 and 37.0 dB at 1532 and 1556 nm, respectively. A maximum gain variation of 1.1 dB was also observed at −25 dBm input signal power over the same range of wavelengths. Accordingly, an optical amplifier consistent with the present invention can attain a substantially flattened gain and also enhance the gain value in the longer wavelengths due to gain saturation behavior. In other words, because the two-stage fiber amplifier has two individual amplifiers in cascaded structure, the gain of the two amplifiers may be enhanced and overlapped until the population inversion of the erbium ions causes gain saturation. The above results demonstrate that an optical amplifier consistent with the present invention can achieve high gain e.g., more than 35 dB over a wavelength range of 1528 to 1562 nm, and the gain profile of the amplifier is substantially flat i.e., the maximum variation of 1.1 dB for −25 dBm input signal power. The gain saturation characteristic of the two-stage amplifier 140 will cause the gain to increase more over a smaller gain region. Therefore, the two-stage amplifier 140 not only flattens the shape of gain spectrum, but also increases gain.

Further advantages consistent with the present invention will next be described with reference to FIG. 8, which illustrates a bit error rate (BER) test results associated with an exemplary amplifier consistent with the present invention. As generally understood, a BER test can be used to determine to what extent a particular component may introduce errors in an optical transmission system.

Figure 8:
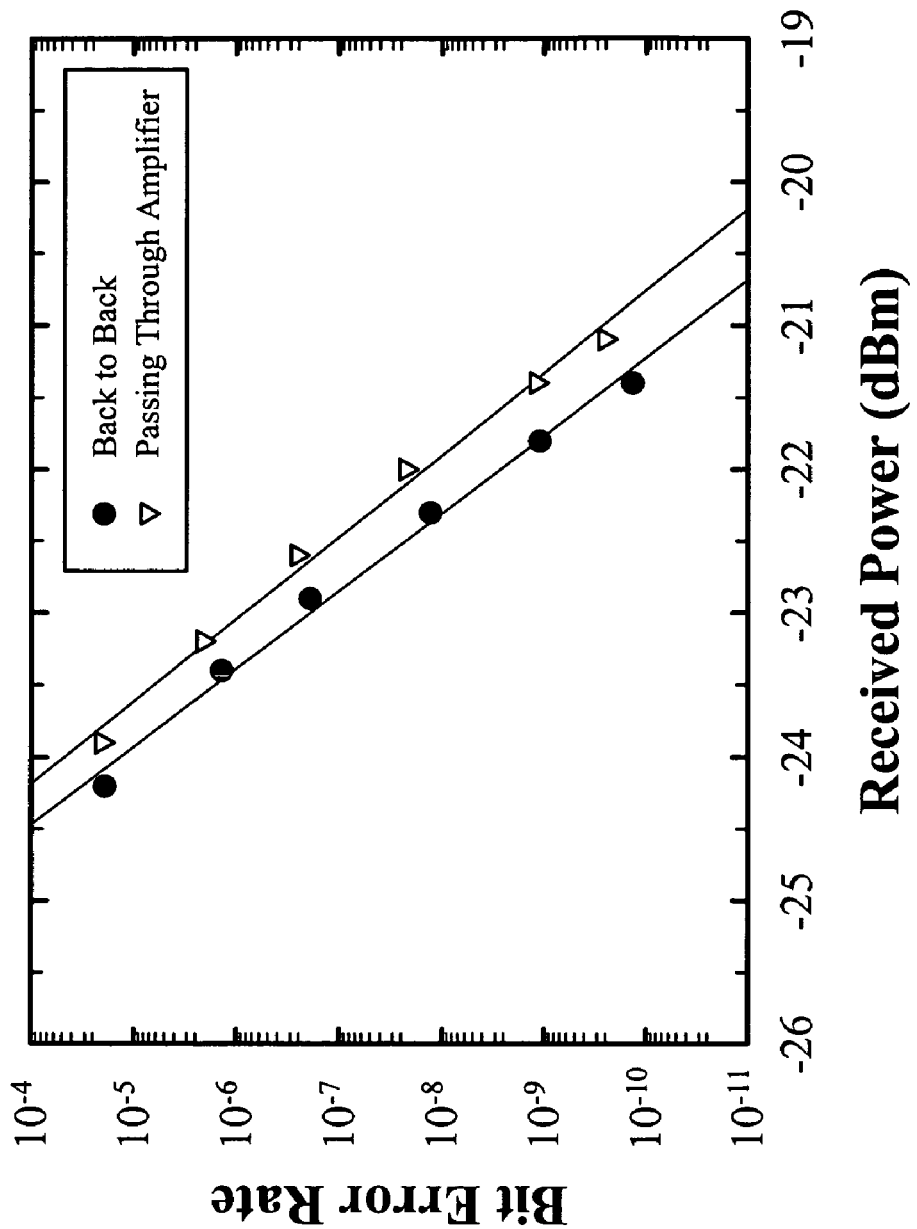
FIG. 8 illustrates a graph of the performance of a bit error rate at a test signal of 1550 nm in 2.5 Gb/s modulated system for a back-to-back type amplifier and a two-stage amplifier system, consistent with an embodiment of the present invention.

In the BER test yielding the results shown in FIG. 8, a test input signal having a wavelength of 1550 nm was modulated in accordance with a 2.5 Gb/s non-return-to-zero pseudo random binary sequence having a pattern length of $2^{31}-1$. The signal was modulated with a LiNbO3 electro optical modulator. In addition, a 2.5 Gb/s optical receiver was used to detect the transmitted signal. In FIG. 8, the BER of a back-to-back configuration, including only a transmitter and receiver, is plotted along with a BER of a configuration including an exemplary amplifier 140 consistent with the present invention provided between the transmitter and receiver. As is evident from the test results, while a test input signal passes through the amplifier 140, the observed optical power penalty is about 0.4 dB.

In summary, a gain-flattened amplifier 140 comprising a first stage 210 and a second stage 220 that are optically connected in series is disclosed. Further, in the operating input signal wavelength range of 1528 to 1562 nm, operational data disclosed herein demonstrate that the obtained gain is larger than 35 dB, the noise figure is within 5.5 to 6.7 dB, and a maximum gain variation of 1.1 dB is obtained when the input signal power is −25 dBm. Therefore, an amplifier 140 consistent with the present invention not only provides a substantially flat and spectrally uniform gain, but also enhances the amount of gain in the wavelength range of 1528 to 1562 nm, the wavelength range associated with many WDM signals.

Figure 9:
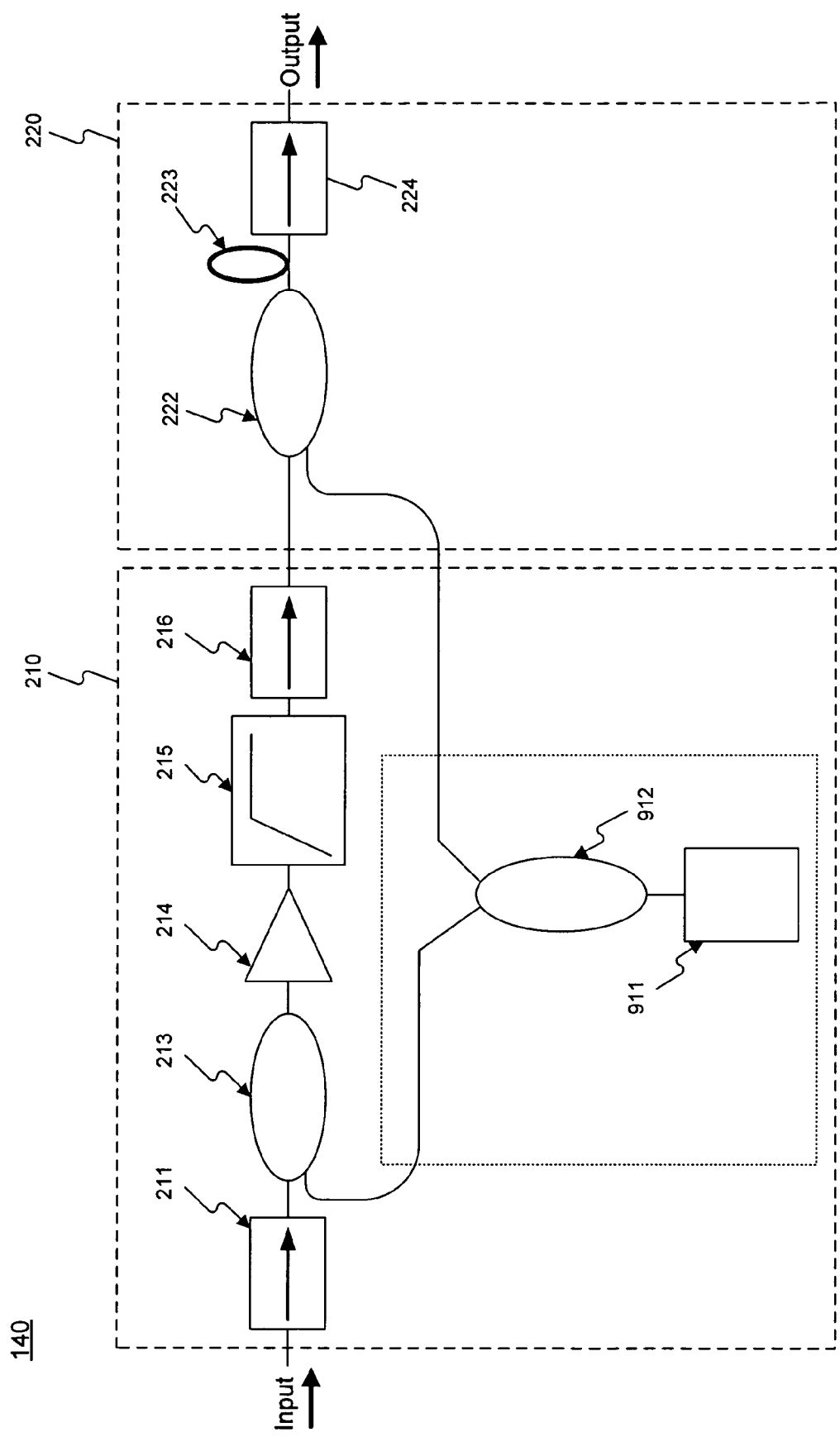
FIG. 9 illustrates a block diagram of another exemplary embodiment of a two-stage amplifier system, consistent with an embodiment of the present invention.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, as illustrated in FIG. 9, an optional pump source sharing configuration between first stage 210 and the second stage 220 may be provided. In particular, a third coupler 912 may be provided which has an input coupled to optical source 911 (e.g., a laser or LED) and first and second outputs coupled to WDM coupler 213 and WDM coupler 222. As a result, a first and second pump light output from source 911 is supplied. The first and second pump light are supplied via WDM couplers 213 and 222 to planar waveguide gain media 214 and erbium doped fiber 223, respectively. Accordingly, instead of two pump sources supplying a first and second pump light, amplifier 140 shown in FIG. 9 has a single pump source 911 supplying both the first and second pump light.

In addition, consistent with a further aspect of the present invention, the stage containing the erbium doped fiber 223 may be configured as the first stage receiving the input WDM signal, and the stage including an erbium doped planar waveguide 214 may be configured as the second stage outputting the amplified WDM signal. Further, although erbium has been described as the fluorescent material of the gain medium in planar waveguide 214 and fiber 223, it is understood that other fluorescent materials and corresponding different pump wavelengths may also be employed, including, for example, other rare earth elements.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit of the invention being indicated by the following claims and their full scope of equivalents.

What is claimed is:

1. An optical amplifier comprising:
    a planar waveguide including a substrate, the substrate including a region doped with a fluorescent material;
    an optical fiber including a core doped with the fluorescent material;
    an optical isolator; and
    an optical filter coupled in series to the optical isolator, the optical filter and the optical isolator disposed between the planar waveguide and the optical fiber and configured to substantially block forward transmission of pump light between the planar waveguide and the optical fiber and substantially block backward transmission of amplified light between the planar waveguide and the optical fiber.

2. An optical amplifier in accordance with claim 1, further comprising:
    a first optical coupler configured to combine a first input optical signal and a first pump light onto a first optical communication path portion, the first optical communication path portion being coupled to the planar waveguide; and
    a second optical coupler being configured to combine a second input optical signal and a second pump light onto a second optical communication path portion, the second optical communication path portion being coupled to the optical fiber.

3. An optical amplifier in accordance with claim 2, further comprising:
    an optical source; and
    a third optical coupler having an input coupled to the source and first and second outputs, the first output being configured to supply the first pump light to the first optical coupler and the second output being configured to supply the second pump light to the second optical coupler.

4. An optical amplifier in accordance with claim 2, wherein the optical isolator is a first optical isolator, the optical amplifier further comprising:
    a second optical isolator coupled to an input portion of the planar waveguide via the first coupler.

5. An optical amplifier in accordance with claim 2, further comprising:
    a first optical source configured to output the first pump light, the first optical source being coupled to the first optical coupler; and
    a second optical source configured to output the second pump light, the second optical source being coupled to the second optical coupler.

6. An optical amplifier in accordance with claim 2, wherein the first and second pump lights include light having a wavelength substantially equal to 980 nm.

7. An optical amplifier in accordance with claim 1, wherein the fluorescent material includes a rare earth element.

8. An optical amplifier in accordance with claim 6, wherein the rare earth element includes erbium.

9. An optical amplifier in accordance with claim 1, wherein the optical amplifier is configured to receive an input optical signal and supply an output optical signal in response to the input optical signal, wherein when the input optical signal has an optical power of −25 dBm and said input optical signal includes a plurality of optical signals having wavelengths in a range of 1528 nm to 1562 nm, an amount of gain associated with the optical amplifier is greater than or equal to 37 dB, and a variation of the gain is equal to or less than 1.1 dB over the range of 1528 nm to 1562 nm.

10. An optical amplifier in accordance with claim 1, wherein an input signal to the optical amplifier is supplied to the planar waveguide and an output signal of the optical amplifier is supplied from the optical fiber.

11. An optical amplifier in accordance with claim 1, wherein an input signal to the optical amplifier is supplied to the optical fiber and an output signal of the optical amplifier is supplied from the planar waveguide.

12. A wavelength division multiplexing transmission system, comprising:
    a plurality of transmitters, each of the plurality of transmitters being configured to transmit a respective one of a plurality of optical signals, wherein each of the plurality of optical signals is at a respective one of a plurality of wavelengths;
    a multiplexer configured to combine the plurality of optical signals onto an optical communication path;
    an optical amplifier comprising:
        a planar waveguide including a substrate, the substrate including a region doped with a fluorescent material,
        an optical fiber including a core doped with the fluorescent material,
        an optical isolator, and
        an optical filter coupled in series to the optical isolator, the optical filter and the optical isolator disposed between the planar waveguide and the optical fiber and configured to substantially block forward transmission of pump light between the planar waveguide and the optical fiber and substantially block backward transmission of amplified light between the planar waveguide and the optical fiber;
    a demultiplexer configured to separate each of the plurality of optical signals based on their respective wavelength; and a plurality of receivers configured to receive the separated optical signals and convert the optical signals into corresponding electrical signals.

13. A wavelength division multiplexing transmission system in accordance with claim 12, wherein the optical amplifier further comprises:
   a first optical coupler configured to combine a first input optical signal and a first pump light onto a first optical communication path portion, the first optical communication path portion being coupled to the planar waveguide;
   a second optical coupler being configured to combine a second input optical signal and a second pump light onto a second optical communication path portion, the second optical communication path portion being coupled to the optical fiber.

14. A wavelength division multiplexing transmission system in accordance with claim 13, wherein the optical amplifier further comprises:
   an optical source; and
   a third optical coupler having an input coupled to the source and first and second outputs, the first output being configured to supply the first pump light to the first optical coupler and the second output being configured to supply the second pump light to the second optical coupler.

15. A wavelength division multiplexing transmission system in accordance with claim 13, wherein the optical isolator is a first optical isolator, the optical amplifier further comprising:
   a second optical isolator coupled to an input portion of the planar waveguide via the first coupler.

16. A wavelength division multiplexing transmission system in accordance with claim 13, wherein the optical amplifier further comprises:
   a first optical source configured to output the first pump light, the first optical source being coupled to the first optical coupler; and
   a second optical source configured to output the second pump light, the second optical source being coupled to the second optical coupler.

17. A wavelength division multiplexing transmission system in accordance with claim 13, wherein the first and second pump lights include light having a wavelength substantially equal to 980 nm.

18. A wavelength division multiplexing transmission system in accordance with claim 12, wherein the fluorescent material includes a rare earth element.

19. A wavelength division multiplexing transmission system in accordance with claim 18, wherein the rare earth element includes erbium.

20. A wavelength division multiplexing transmission system in accordance with claim 12, wherein the optical amplifier is configured to receive an input optical signal and supply an output optical signal in response to the input optical signal, wherein when the input optical signal has an optical power of −25 dBm and said input optical signal includes a plurality of optical signals having wavelengths in a range of 1528 nm to 1562 nm, an amount of gain associated with the optical amplifier is greater than or equal to 37 dB, and a variation of the gain is equal to or less than 1.1 dB over the range of 1528 nm to 1562 nm.

21. A wavelength division multiplexing transmission system in accordance with claim 12, wherein an input signal to the optical amplifier is supplied to the planar waveguide and an output signal of the optical amplifier is supplied from the optical fiber.

22. A wavelength division multiplexing transmission system in accordance with claim 12, wherein an input signal to the optical amplifier is supplied to the optical fiber and an output signal of the optical amplifier is supplied from the planar waveguide.

* * * * *